3,013,064
PREPARATION OF LOWER ALKYL CARBAMATES

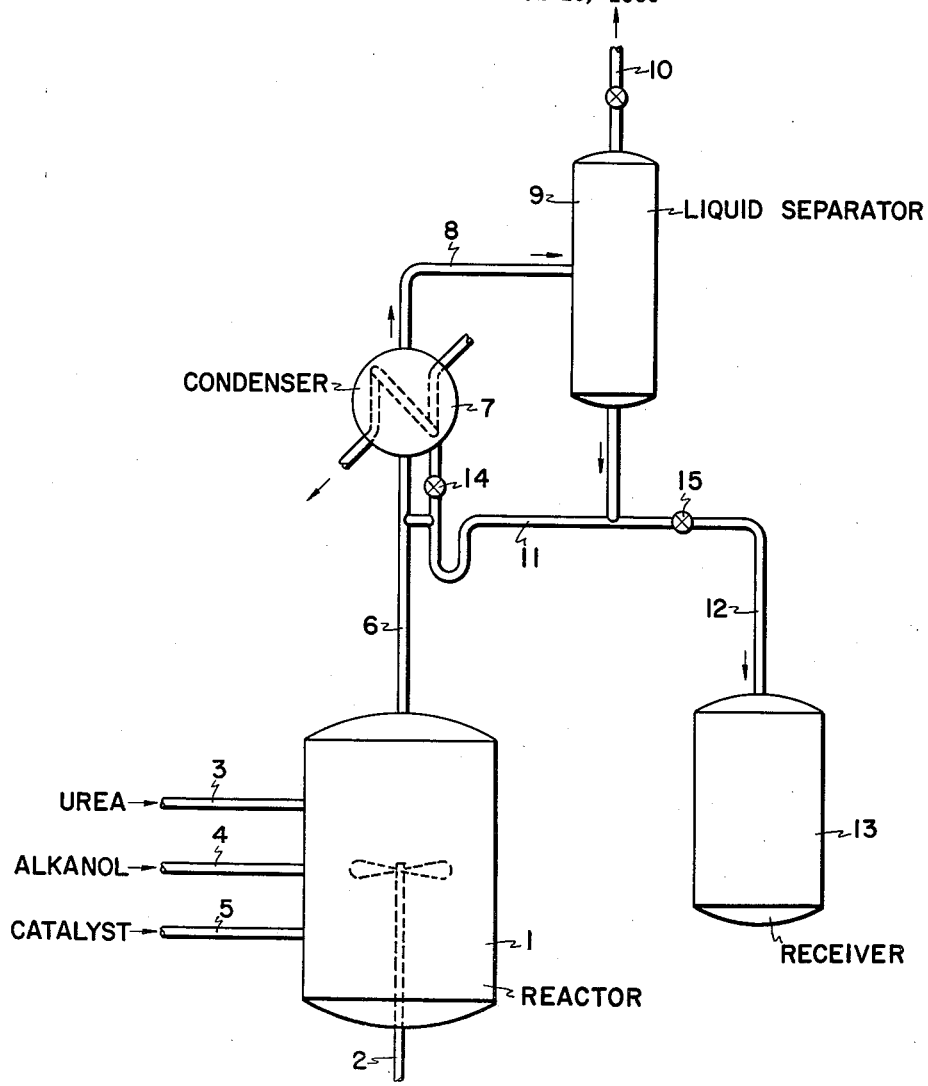

Sidney Beinfest, Berkeley Heights, and Joseph Halpern, New Providence, N.J., assignors to Berkeley Chemical Corporation, Berkeley Heights, N.J., a corporation of New Jersey
Filed Mar. 10, 1960, Ser. No. 14,147
5 Claims. (Cl. 260—482)

This invention relates to new and useful improvements in the preparation of lower alkyl carbamates. More particularly it relates to the preparation of these materials by a process in which plugging of vapor withdrawal lines is prevented.

Alkyl monocarbamates such as ethyl carbamate have been finding increasing utility both as medicinals themselves and particularly as reactants in the preparation of alkanediol dicarbamates, a promising class of "tranquilizing" drugs as well as other uses.

These materials have been prepared by reacting lower alkanols with urea both non-catalytically and with a catalyst; see our U.S. Patent 2,837,561 which discloses catalysts such as cupric salts of carboxylic acids. Other salts such as aluminum alkoxides, ammonium acetate, zinc, manganese, tin, cobalt and nickel salts can be used. Anions other than those listed include borates, formates, chlorides, oxalates and oxides can also be used. Related organo-metallic compounds can be used. Promoters such as alkali and alkaline earth salts of organic acids have also been found useful.

This reaction proceeds readily at about 125° C. or above. In case of higher alcohols it can be carried out at atmospheric pressure. For the lower alcohols, to reach the desired temperature, pressure equipment is necessary.

The literature methods thus teach employing an autoclave with no provision for ammonia removal.

Attempts to remove the ammonia have been characterized by undesirable deposition of condensation products from the withdrawn effluent vapors. These products result in plugging of the overhead vapor withdrawal lines and can lead to process shutdowns. The increased use of the lower alkyl monocarbamates thus depends on an improved method of preparing them.

It has now been found that these plugging difficulties in the affected lines can be prevented by maintaining the lines at a minimum temperature in the range of 50–100° C. and preferably 58–80° C. depending on the pressures employed.

The lower alkanols that can be employed are the $C_1$ to $C_3$ alkanols and thus include methanol, ethanol, propanol and isopropanol. They are preferably employed in the anhydrous form available. The amount of alkanol utilized is about 1.1–3 mol/1 mol urea.

The reaction temperature utilized is in the range of 130–155° C. with pressures in the range of 3–10 atmospheres absolute.

The catalysts when employed are utilized in an amount of about 0.001–0.1 mol/mol urea.

As stated previously plugging is prevented in the affected overhead lines by maintaining them at the minimum temperatures stated with the other reaction conditions as indicated. The lines can be so maintained by any means of non-interfering heat transfer, preferably indirect heat exchange with heated water.

This invention and its advantages will be better understood by reference to the following examples and flow diagram.

Example I

Referring to the flow diagram into reactor 1 were charged 600 gms. of urea through line 3, 1450 cc. of ethanol through line 4 and 40 gms. of cupric acetate through line 5. The mixture was maintained at 140° C. and stirred by agitator 2. The pressure was 5–6 atmospheres absolute. The overhead mixture in line 6 contained alcohol vapors, ammonia, some $CO_2$ and other gases. The heat exchanger 7 cooled with water at 90° C. condensed most of the ethanol which returned back down line 6 to the reactor. The uncondensed gases were sent by line 8 through liquid separator 9 and vented through valved line 10. They can be taken to an ammonia measuring system for control purposes. The pressure was controlled by the rate of gas release in valved line 10 to maintain an actively boiling mixture in the reactor at the temperature of 140–150° C. The condenser 7, line 8, separator 9 and valved line 10 were all maintained at a temperature of 85° C.

Separated ethanol returned by gravity through line 11 to column 6. This line was also heated to 85° C. by a hot water jacket. At the end of the reaction magnetic valve 14 was set to collect condensate from condenser 7 to feed it through lines 11 and 12 to receiver 13. Valve 15 blocks off the entry of ammonia and other gases during the reaction. The excess alcohol was thus removed by distillation and collected in receiver 13. The ethyl carbamate product in reactor 1 was further purified by fractional distillation at reduced pressures. No plugging in the overhead lines was encountered. The residue in the reactor after ethyl carbamate removal can be utilized in subsequent reactions.

Example II

An identical example as in the preceding one was run except that lines 8 and 10 and separator 9 were allowed to remain at ambient temperature, e.g. 25° C. The valve 10 clogged up and after continuous cleaning, lines 8 and 10 plugged forcing a shut-down. This demonstrates the importance of the temperature control of this invention.

In addition to the lower alkanols listed, this process can also be applied to the use of allyl alcohols and mixtures of the lower alkanols. Conditions can be varied somewhat, e.g. higher reaction temperatures can be used with corresponding variations in other conditions. Above about 175° C. the pressure builds up for ethanol to about 17 atmospheres and the exit line temperatures have to be accordingly adjusted.

The advantages of this invention will be apparent to the skilled in the art. Equipment shut-downs are avoided in a simple, easily controlled operation.

It is understood that this invention is not limited to the specific examples which have been offered merely as illustrations and that modifications may be made without departing from the spirit of the invention.

What is claimed is:

1. In a process for preparing a lower alkyl carbamate by reacting a $C_1$–$C_3$ alkanol with urea at a temperature in the range of 130 to 155° C. and a pressure in the range of 3 to 10 atmospheres wherein effluent vapors are withdrawn from the reaction zone and give rise to condensation deposits which cause plugging in the withdrawal line the improved method of preventing the plugging which comprises maintaining the withdrawal line at a minimum temperature in the range of 58–80° C.

2. The process of claim 1 in which the alkanol is ethanol.

3. The process of claim 1 in which the alkanol is methanol.

4. The process of claim 1 in which the alkanol is isopropanol.

5. The process of claim 1 in which a mixture of lower alkanols is employed.

References Cited in the file of this patent
UNITED STATES PATENTS
2,837,561    Beinfest _____ June 3, 1958